United States Patent
Earl et al.

(10) Patent No.: US 9,300,623 B1
(45) Date of Patent: Mar. 29, 2016

(54) DOMAIN NAME SYSTEM CACHE INTEGRITY CHECK

(71) Applicant: Sprint Communications Company L.P., Overland Park, KS (US)

(72) Inventors: Bryson Earl, Altamonte Springs, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 195 days.

(21) Appl. No.: 14/183,518

(22) Filed: Feb. 18, 2014

(51) Int. Cl.
*G06F 15/16* (2006.01)
*H04L 29/12* (2006.01)

(52) U.S. Cl.
CPC ........ H04L 61/1511 (2013.01); H04L 61/6009 (2013.01); *H04L 61/1552* (2013.01)

(58) Field of Classification Search
CPC ............ H04L 61/1511; H04L 61/1552; H04L 61/6009
See application file for complete search history.

(56) References Cited

U.S. PATENT DOCUMENTS

| | | | |
|---|---|---|---|
| 7,673,331 B2* | 3/2010 | Kido | H04L 63/062 713/155 |
| 8,117,296 B2* | 2/2012 | Liu | H04L 29/12066 709/223 |
| 8,234,490 B2* | 7/2012 | Kido | H04L 63/0823 713/156 |
| 9,059,884 B2* | 6/2015 | Robinson | H04L 29/12066 |
| 2009/0092247 A1* | 4/2009 | Kido | H04L 63/062 380/30 |
| 2010/0111300 A1* | 5/2010 | Kido | H04L 63/0823 380/46 |
| 2012/0191874 A1* | 7/2012 | Robinson | H04L 29/12066 709/245 |
| 2012/0284505 A1* | 11/2012 | Smith | H04L 61/1511 713/151 |
| 2013/0204978 A1* | 8/2013 | Fleischman | H04L 61/1511 709/219 |

\* cited by examiner

*Primary Examiner* — Moustafa M Meky

(57) ABSTRACT

A domain name system (DNS) cache integrity check system is provided. The system comprises a checking server which comprises an application stored in a memory that, when executed by a processor, checks domain name to internet protocol (IP) address mappings amongst a plurality of DNS cache servers. The checking application consults a valid list data store and identifies a discrepant domain name to IP address mapping. The application requests for a mapping list from an authoritative DNS server. The checking application compares the discrepant mapping to the authoritative DNS server list, if the discrepant mapping is located on the authoritative DNS server list, the discrepant mapping is authorized and written to the valid list, if the discrepant mapping is not located on the authoritative DNS server list, the DNS cache server with the discrepant mapping is flushed and replaced with an authorized mapping from the authoritative DNS server list.

20 Claims, 5 Drawing Sheets

DOMAIN NAME SYSTEM CACHE INTEGRITY CHECK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Domain name system (DNS) poisoning occurs when an attacker pretends to be an authoritative DNS server and manages to fool a caching server into believing that the records provided by the attacker are legitimate. The caching server requests a DNS mapping from the authoritative DNS server, wherein the authoritative DNS server is a well-known address or is a well-known server. A well-known address or alternatively a well-known server is in reference to a well-known internet protocol (IP) address that is known to the public. For example, IP addresses of authoritative DNS servers and DNS cache servers may be publically known to support any hosts or routers sending DNS requests to them. When cache servers request a DNS mapping from the authoritative DNS server, an attacker assumes that the cache server is requesting lookups from popular services and forges replies for the cache server to take in. Alternatively, when a cache server requests a DNS mapping from the authoritative DNS server, an attacker—who may be "sniffing" packets transiting the network to find one addressed to an authoritative DNS server (which has a "well known" IP address) sent by a DNS cache server (which likewise has a "well known" IP address)—may intercept or copy that DNS look-up request and reply to it with a bogus domain name to IP address mapping, for example a mapping that associates the domain name to an IP address of a malicious web site. This may result in users or hosts that request a domain name to IP address mapping for the subject domain name being redirected to a malicious site of the attacker's choice.

SUMMARY

In an embodiment, a method of facilitating a domain name system (DNS) cache integrity check system is disclosed. The method comprises checking each of a plurality of domain name to internet protocol (IP) address mappings of a plurality of DNS cache servers via a checking application of a checking server. The method further comprises consulting a valid list data store, wherein the valid list data store comprises a plurality of authorized domain name to IP address mappings. The method further comprises in response to consulting the valid list, identifying a discrepant domain name to IP address mapping by the checking application, wherein the discrepant domain name to IP address mapping is a domain name to IP address mapping that is not located on the valid list. The method further comprises in response to identifying a discrepant domain name to IP address mapping, requesting a domain name to IP address mapping for at least one of the DNS cache servers from an authoritative DNS server via the checking application. The method further comprises writing the authorized domain name to IP address mapping received from the authoritative DNS server to the valid list.

In an embodiment, a method of enacting a domain name system (DNS) cache integrity check system is disclosed. The method comprises checking each of a plurality of domain name to internet protocol (IP) address mappings of a plurality of DNS cache servers via a checking application of a checking server. The method further comprises consulting a valid list data store, wherein the valid list data store comprises a plurality of authorized domain name to IP address mappings. The method further comprises in response to consulting the valid list, identifying at least one domain name to IP address mapping, stored in a DNS cache server that is not located on the valid list via the checking application of the checking server. The method further comprises in response to identifying a discrepant domain name to IP address mapping, requesting a domain name to IP address mapping list from an authoritative DNS server via the checking application, wherein a discrepant domain name to IP address mapping is a domain name to IP address mapping that is not located on the valid list. The method further comprises in response to receiving the request, sending the domain name to IP address mapping list to the checking server via the authoritative DNS server. The method further comprises in response to receiving the domain name to IP address mapping list from the authoritative DNS server, comparing the discrepant domain name to IP address mapping with the domain name to IP address mappings located on the domain name to IP address mapping list received from the authoritative DNS server by the checking application; if the discrepant domain name to IP address mapping is located on the list received from the authoritative DNS server, the discrepant domain name to IP address mapping is written onto the valid list; if the discrepant domain name to IP address mapping is not located on the domain name to IP address mapping list received from the authoritative DNS server, the DNS cache server with the discrepant domain name to IP address mapping is flushed and replaced with a valid domain name to IP address mapping from the domain name to IP address mapping list received from the authoritative DNS server.

In an embodiment, another method of enacting a domain name system (DNS) cache integrity check system is disclosed. The method comprises checking each of a plurality of domain name system (DNS) records of a plurality of DNS cache servers via a checking application of a checking server, consulting a valid list data store wherein the valid list data store comprises a plurality of authorized DNS records, and in response to consulting the valid list, identifying at least one DNS record that is not located on the valid list via the checking server. The method further comprises, in response to identifying a discrepant DNS record, requesting a DNS record from an authoritative DNS server via the checking server, wherein a discrepant DNS record is a DNS record that is not located on the valid list. The method further comprises, in response to receiving a response from the authoritative DNS server, comparing the discrepant DNS record with the response received from the authoritative DNS server via the checking server, if the discrepant DNS record is located in the response received from the authoritative DNS server, the DNS record is written on to the valid list, if the discrepant DNS record is not located in the response received from the authoritative DNS server, the DNS cache server with the discrepant DNS record flushes the discrepant DNS record and replaces the discrepant DNS record with a DNS record received in the response from the authoritative DNS server.

In an embodiment, a domain name system (DNS) checking server is disclosed. The checking server comprises a processor, a memory, and an application stored in the memory that, when executed by the processor, accesses a plurality of domain name to internet protocol (IP) address mappings stored by a plurality of DNS cache servers. The application compares the plurality of domain name to IP address mappings stored by the plurality of DNS cache servers. The application requests at least one domain name to IP address mapping for at least one domain name accessed from at least one of the DNS cache servers from an authoritative server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
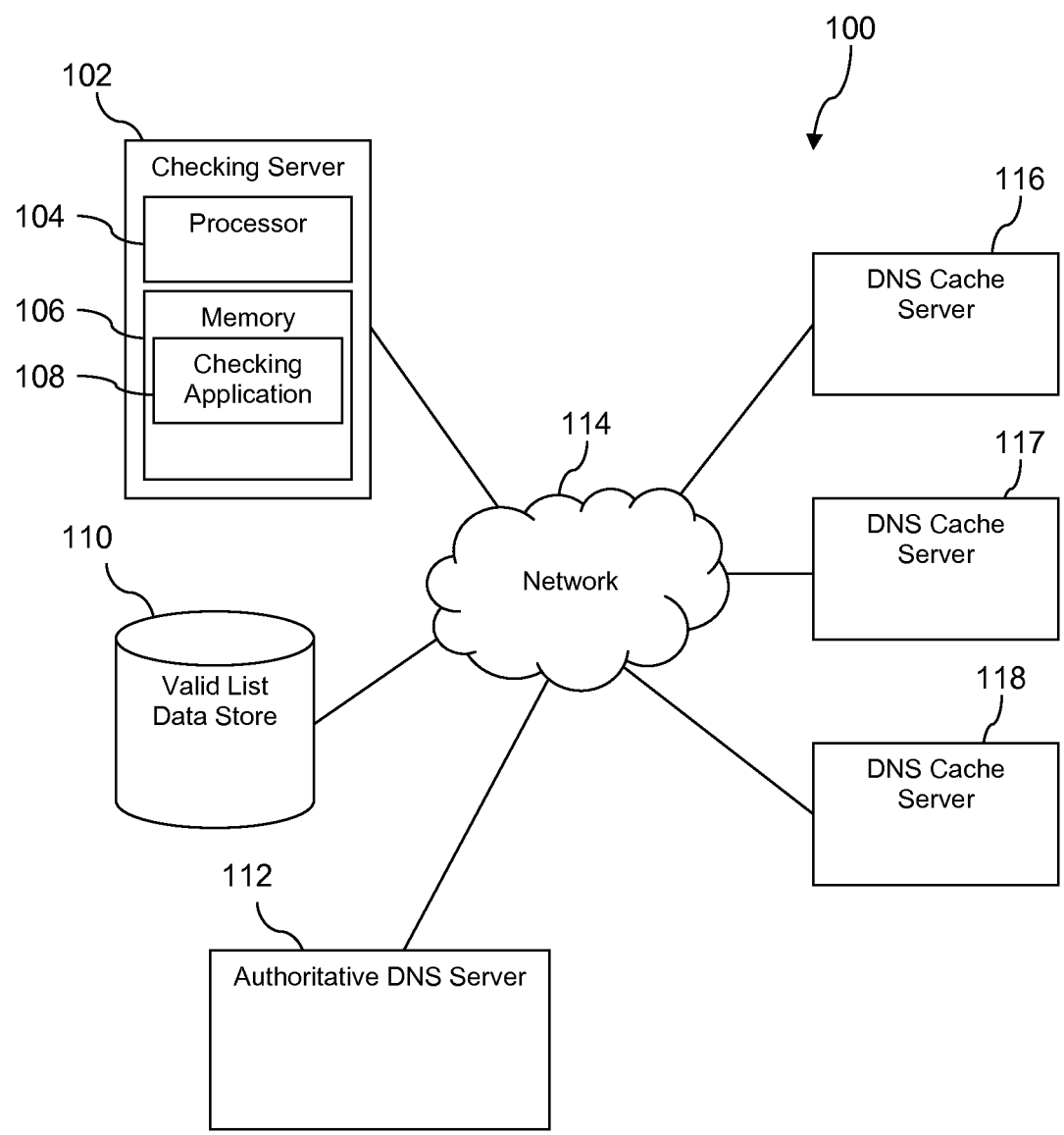
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for a domain name system (DNS) cache integrity check system. In an embodiment, the DNS cache integrity check system may detect and notify administrators of potential DNS cache 'poisoning' on a list of domains across a DNS infrastructure, wherein an example of DNS cache poisoning may occur when a malefactor attempts to hijack a domain name to internet protocol (IP) address mapping and rig it to lead to a different IP address where a user may be infected with a virus or be exposed to some other malware. The system and methods comprise a checking server. The checking server further comprises a checking application that compares domain name records, for example domain name to IP address mappings, amongst a plurality of DNS cache servers.

Without the checking server and the checking application, it is possible that existing DNS cache servers may be poisoned by attackers that wish to corrupt the DNS records stored in one or more of the cache servers, for example to hijack domain name to IP address mappings of DNS cache servers to spread viruses and network infections. While many examples herein are directed to domain name to the IP address mapping DNS record type (A record type and AAAA record type), it is understood that the DNS cache integrity check system supports checking and maintaining valid DNS cache server entries for a variety of DNS record types. For example, but not by way of exhaustively enumerating, the DNS cache integrity check system promotes maintaining domain name to IP address mappings (A record type and AAAA record type), IP address to domain name mappings (reverse look-ups), mail server records (MX record type), alias records (CNAME record type), security key records (DS record type), as well as other DNS record types.

The checking server and the checking application along with the valid list data store promotes a more rapid propagation of DNS record changes, for example DNS to IP address mapping changes, and reduces the risk that the domain name to IP address mappings that are being used are invalid. With the checking server being a non-well-known server, there is little chance for the execution of the system to be tampered with by attackers.

In an embodiment, the checking application makes its comparisons of the DNS records of the DNS cache servers about every four minutes. If the checking application finds no discrepancies, the process pauses until the checking application runs again. An example of a discrepancy or a mismatch may be when a cache server deemed as cache "A," which comprises a mapping for a domain name 'a' which leads to a first IP address is compared to another cache server deemed cache "B," which comprises the mapping for the domain name 'a' which leads to a second IP address. If the checking application finds that there are domain name to IP address mappings that do not match between the DNS cache servers, the checking application consults a valid list data store that comprises authorized domain name to IP address mappings.

The valid list data store comprises a list of valid DNS records, for example valid domain name to IP address mappings. The checking application consults the valid list when two DNS records are compared and deemed discrepant, for example when two domain name to IP address mappings are compared and are deemed to be discrepant. A discrepancy may be identified when the two mappings are found to have the same domain name but map to two different IP addresses. The checking application compares the discrepant domain name to IP addresses to the mappings for that domain name on the valid list. In the case of other record types, the checking application compares corresponding discrepant DNS records and searches the valid list for validation of the discrepant DNS records.

When at least one of the discrepant DNS records is not found on the valid list, for example when at least one of the domain name to IP address mappings that are compared is not identified on the valid list, the checking application requests a list of authorized DNS records of the subject DNS record type, for example domain name to IP address mappings for the domain name in question, from an authoritative DNS server and compares the discrepant DNS record to the authoritative DNS server DNS records, for example the domain name to IP address mapping to the authoritative DNS server list. In an embodiment, the checking application requests the DNS record, for example the domain name to IP address mapping, from the authoritative DNS server over a transmission control protocol (TCP) session connection. In an embodiment, a TCP connection may be used because it provides more inherent security than a more typical user datagram protocol (UDP) communication which may be deemed "connectionless." It is understood that using a TCP connection to communicate with the authoritative DNS server may entail more overhead, but the checking application may perform these accesses relatively infrequently with reference to the frequency of accesses to the DNS cache servers. Notwithstanding, in an embodiment, the checking application may send DNS requests to the authoritative DNS server employing user datagram protocol (UDP) communications.

If the discrepant DNS record, for example the discrepant domain name to IP address mapping, is located on the authoritative DNS server list, the DNS record, for example the domain name to IP address mapping, is written to the valid list. If the discrepant DNS record, for example the domain name to IP address mapping, is not found on the authoritative DNS server list, the discrepant DNS record, for example the domain name to IP address mapping, is flushed from the subject DNS cache server or servers and replaced by a valid DNS record, for example a valid domain name to IP address mapping, from the authoritative DNS server list. If the discrepant DNS record, for example the domain name to IP address mapping, is not found on the authoritative server list the DNS record is deemed invalid and may be associated with a "poisoning" attempt or an attempt to "poison" a DNS cache server. With the check of DNS cache servers by the checking application done about every four minutes, rapid propagation of changes of DNS record information, for example changes to domain name to IP address mapping, is promoted.

Turning now to FIG. 1, a communication system 100 is described. In an embodiment, the system 100 comprises a checking server 102. In an embodiment the checking server 102 is not a well-known server, wherein the internet protocol (IP) address of the checking server 102 is not a well-known IP address. A "well-known" IP address may be an IP address that is published, announced, and/or readily discoverable using commonly used network functions. For example, the IP addresses of DNS cache servers and authoritative DNS servers may be well known, whereby routers and hosts are readily able to send DNS lookup requests to those servers. The DNS system may provide application programming interface (API) functions that allow hosts and/or routers to discover or learn a variety of domain name system information, for example the IP addresses of various DNS servers, for example to learn the IP addresses of DNS cache servers and of authoritative DNS servers; for example to learn the domain names associated with IP addresses (e.g., reverse look-ups); for example, to resolve aliases to IP addresses; for example, to learn mail servers; etc. By contrast, the IP address of the checking server 102 is not published, broadcasted, or discoverable through an interface accessible outside the enterprise that owns or operates the checking server 102.

In an embodiment, the checking server 102 comprises at least a processor 104 and a memory 106. The memory 106 may further comprise a checking application 108. The system 100 may further comprise a network 114. In an embodiment, the checking server 102 is communicatively coupled to the network 114, wherein the network 114 comprises a public communication network, a private communication network or a combination thereof. The system 100 may further comprise a plurality of DNS cache servers 116-118 that are communicatively coupled to the network 114. The system 100 may further comprise a valid list data store 110 that hereafter will be known as the valid list 110, and an authoritative DNS server 112 which are both communicatively coupled to the network 114. In an embodiment, the DNS cache servers 116-118 may contain a variety of DNS records, for example domain name to internet protocol (IP) address mappings that are in use by the network 114. In an embodiment, the DNS cache servers 116-118 may be executed on one or more computer systems. Computer systems are discussed further hereinafter.

In an embodiment, it is understood that DNS cache servers receive requests for DNS records from other computer systems and/or users, for example domain name to IP address mapping requests from computer systems. For example, when a user of a network sends a message to a website, the computer system that receives this request may request a mapping of the domain name of the website to an IP address from a well-known DNS cache server, that DNS cache server retrieves the mapping of the aforementioned website to an IP address from its own cache or by requesting the mapping from an authoritative DNS server, the DNS cache server sends the mapping of the website to an IP address to a computer system, and the computer system sends the message from the user to the IP address. Since all routing of data packets in the IP network is done based on IP address, hence, the user request that is directed to a domain name must first be mapped or translated to an IP address before routing on the IP network can proceed.

In an embodiment, the valid list data store 110 comprises domain name to IP address mappings that are deemed valid. In an embodiment, under some conditions, the checking application 108 consults the valid list data store 110 to see if the domain name to IP address mappings of the plurality of DNS cache servers 116-118 are valid. In an embodiment, the authoritative DNS server 112 is responsible for storing domain name to IP address mappings and may assign a time to live value for domain name to IP address mappings, wherein the given time to live value may be less than one day, at least one day, or some other predefined period of time. In an embodiment, while the system 100 shows three DNS caches servers 116-118, it is understood that the system 100 may comprise any number of DNS cache servers.

In an embodiment, the checking application 108 may access the DNS cache servers 116-118 and compare the domain name to IP address mappings with each other. The checking application 108 may find that there are no discrepant domain name to IP address mappings which results in a pause of the system 100 until the checking application 108 accesses and compares the domain name to IP address mappings of the DNS cache servers 116-118 once again. A discrepant domain name to IP address mapping is a domain name to IP address mapping that does not match other domain name to IP address mappings amongst the plurality of DNS cache servers 116-118. Further, a discrepancy is when there are two domain name to IP address mappings for one domain name that lead to two different IP addresses.

The checking application 108 may find that there are multiple domain name to IP address mappings for the same domain name in the DNS cache servers 116-118, it is at this point that the checking application 108 consults the valid list 110 to see if the discrepant domain name to IP address mappings are valid and match the domain name to IP address mappings on the valid list 110. If the discrepant domain name to IP address mappings are located on the valid list 110, the system 100 is paused until the checking application 108 accesses and compares the domain name to IP address mappings of the DNS cache servers 116-118 once again.

If a discrepant domain name to IP address mapping not found on the valid list 110, the checking application 108 may then request a list of all domain name to IP address mappings for the subject domain name from the authoritative DNS server 112. In an embodiment, the checking application 108 of the checking server 102 may request the domain name to IP address mapping list from the authoritative DNS server 112 over a transmission control protocol (TCP) session connection. Alternatively, in another embodiment, the checking server 102 may request the domain name to IP address mapping from the authoritative DNS server 112 employing a user datagram protocol communication or employing a different transport-layer communication protocol. In an embodiment, the IP address of the checking server 102 is not a well-known IP address. In an embodiment, the checking application 108 may request a domain name to IP address mapping from the authoritative DNS server 112 over a transmission control protocol (TCP) session connection. In an embodiment, the authorized domain name to IP address mapping may be received from the authoritative DNS server 112 in response to the request for the domain name to IP address mapping sent to the authoritative DNS server 112 over the TCP session connection. In an embodiment, the checking application 108 communicates with the authoritative DNS server 112 using a TCP connection because a TCP connection provides more inherent security than a more typical user datagram protocol (UDP) session connection.

If the discrepant domain name to IP address mapping is determined to be valid when compared to the authoritative DNS server 112 list received by the checking application 108, the discrepant domain name to IP address mapping is written to the valid list 110. If the discrepant domain name to IP address mapping is not identified on the authoritative DNS server 112 list, the checking application 108 may alert the one or more DNS cache servers 116-118 that contain the discrepant domain name to IP address mapping to flush the discrepant domain name to IP address mapping and then replace the discrepant mapping with a valid mapping from the authoritative DNS server 112 list. In an embodiment, checking application 108 may determine that the discrepant domain name to IP address mapping is not authorized by the authoritative DNS server 112. The DNS cache servers 116-118 that store the unauthorized domain name to IP address mapping may delete the unauthorized domain name to IP address. In an embodiment, an authorized domain name to IP address mapping may be written for the domain name identified in the in the unauthorized domain name to IP address mapping into one of the DNS cache servers 116-118 and the unauthorized domain name to IP address mapping is deleted from that sever. In an embodiment, if the discrepant domain name to IP address mapping is not located on the authoritative DNS server 112 list, a notification may be transmitted. The notification may be transmitted to an employee of a telecommunications service provider or any content providers or domain owners, wherein the employee is one of a system administrator, an information security technologist, or a manager. The notification may comprise the discrepant domain name to IP address mapping.

For example, a notification and/or email message about the discrepant domain name to IP address mapping may be sent to a work station or a mobile communication device used by the employee, and a message about the discrepant domain name to IP address mapping may be presented on the display of the workstation or mobile communication device. In an embodiment, the employee may flush the discrepant domain name to IP address mapping on any of the DNS cache servers 116-118 that it appears on and replace the discrepant domain name to IP address mapping with a valid domain name to IP address mapping that is on the list from the authoritative DNS server 112. In an embodiment, the employee may take note of what might have been a poisoning attack on the DNS cache servers 116-118.

In an embodiment, the checking application 108 is executed by the processor 104 of the checking server 102 and checks a plurality of domain name to IP address mappings stored by the plurality of DNS cache servers 116-118. The checking application 108 checks the plurality of DNS cache servers 116-118 in intervals of about every four minutes. In an embodiment, the checking application 108 may check the plurality of DNS cache servers 116-118 in intervals of about every minute, about every two minutes, about every five minutes, about every ten minutes, about every thirty minutes, or about every hour. Once the checking application 108 checks the plurality of DNS cache servers 116-118, the checking application 108 compares the domain name to IP address mappings amongst the DNS cache servers 116-118, looking for domain name to IP address mappings that do not match. In an embodiment, because the checking application 108 checks the plurality of domain name to IP address mappings at the aforementioned rates, propagation of changed domain name to IP address mappings is promoted.

In an embodiment, as mentioned above, if the checking application 108 finds no discrepancies during its check of the DNS cache servers 116-118, the system 100 pauses until the checking application 108 makes its next check of the DNS cache servers 116-118. In an embodiment, in certain circumstances, the checking application 108 may find a discrepant domain name to IP address mapping, wherein a discrepant domain name to IP address mapping at the level of the DNS cache servers 116-118 is when there are at least two of a particular domain name to IP address mapping for the same domain name. If this is the case, the checking application 108 consults the valid list data store 110. If the discrepant domain name to IP address mapping is found to match a mapping on the valid list 110, the checking application 108 moves on to process the next domain name to IP address mapping in like fashion.

In response to consulting the valid list 110, the checking application 108 may identify at least one domain name to IP address mapping that is not located on the valid list 110. In an embodiment, in response to locating a discrepant domain name to IP address mapping, the checking application 108 sends a request for a domain name to IP address mapping list to the authoritative DNS server 112. In an embodiment, the authoritative DNS server 112 list received via the checking application 108 comprises all valid domain name to IP address mappings for the domain name in question. In an embodiment, the checking application 108 and the checking server 102 communicate over a transmission control protocol (TCP) session connection whenever they query the authoritative DNS server 112 for the list of domain name to IP address mappings. In an embodiment, a TCP connection is used between the checking application 108 of the checking server 102 and the authoritative DNS server 112 because while there may be more over-head than a more typical user datagram protocol (UDP) connection, the TCP connection provides more security than a UDP connection. Notwithstanding, in an alternative embodiment, a user datagram protocol communication may be employed to request mappings from the authoritative DNS server 112.

If the discrepant domain name to IP address mapping matches a mapping on the authoritative DNS server 112 list received by the checking application, the discrepant domain name to IP address mapping is written on to the valid list 110 by the checking application 108. In an embodiment, if the discrepant domain name to IP address mapping remains discrepant after being compared to the authoritative DNS server 112 list, the DNS cache servers 116-118 that the discrepant mapping is located on are alerted by the checking application 108 to flush and replace the discrepant domain name to IP address mapping with a valid domain name to IP address mapping from the authoritative DNS server 112 list.

In another embodiment, a snapshot of all of the domain name to IP address mappings of the plurality of DNS cache servers 116-118 may be taken by the checking application 108, wherein the snapshot is a file that stores all of the domain name to IP address mappings amongst the plurality of DNS cache servers 116-118. In an embodiment, if a snapshot is taken, the checking application 108 then checks the snapshot file to see if there are any discrepancies. If there is a discrepancy, the checking application 108 uses the snapshot file to compare the discrepant domain name to IP address mapping to the valid list 110. If there is not a discrepancy, the snapshot file is cleared. If there is a discrepancy when compared to the valid list 110, the checking application 108 follows the same execution of the system 100, wherein the checking application 108 requests the domain name to IP address mapping list from the authoritative DNS server 112 and compares the discrepant domain name to IP address mapping to the mappings on authoritative DNS server 112 list. If there is still a discrepancy, the checking application 108 alerts the DNS cache servers 116-118 to flush themselves of the discrepant domain name to IP address mapping and replace the discrepant mapping with a valid mapping from the authoritative DNS server 112 list. As said further above, while much of the discussion above was directed to checking domain name to IP address mappings in the DNS cache servers 116-118, the system 100 and the checking application 108 also supports checking other DNS record types. For the purposes of being concise the example of domain name to IP address mapping DNS record type (A record type and AAAA record type) was used for illustrating the features and functionality of the system 100 and/or the checking application 108.

Figure 2:
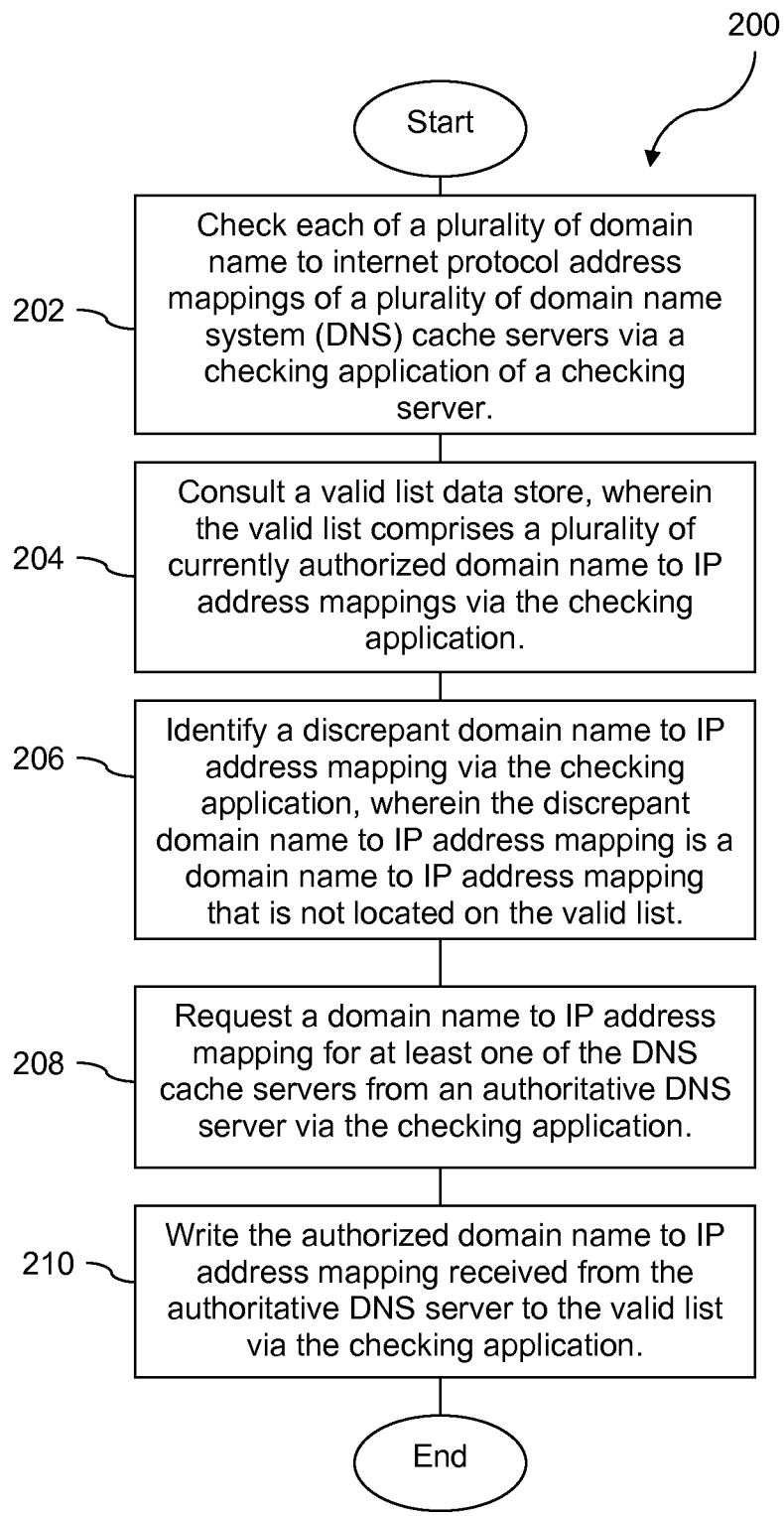
FIG. 2 is a flow chart of a method according to an embodiment of the disclosure.

In FIG. 2, a method 200 is described. At block 202, a checking application via a checking server checks each of a plurality of DNS records, for example each of a plurality of domain name to internet protocol (IP) address mappings of a plurality of domain name system (DNS) cache servers. At block 204, if the checking application identifies a DNS record that does not match a corresponding DNS record in a different caching server, for example identifies a domain name to IP address mapping that does not match other domain name to IP address mappings, the checking application consults a valid list data store, wherein the valid list comprises a plurality of currently authorized DNS records, for example a plurality of domain name to IP address mappings. At block 206, the checking application identifies a discrepant DNS record, for example a discrepant domain name to IP address mapping, wherein the discrepant domain name to IP address mapping is a domain name to IP address mapping that is not located on the valid list. At block 208, the checking application requests a DNS record, for example a domain name to IP address mapping, for at least one of the DNS cache severs from an authoritative DNS server. At block 210, the checking application writes the authorized DNS record, for example the authorized domain name to IP address mapping, received from the authoritative DNS server to the valid list.

Figure 3:
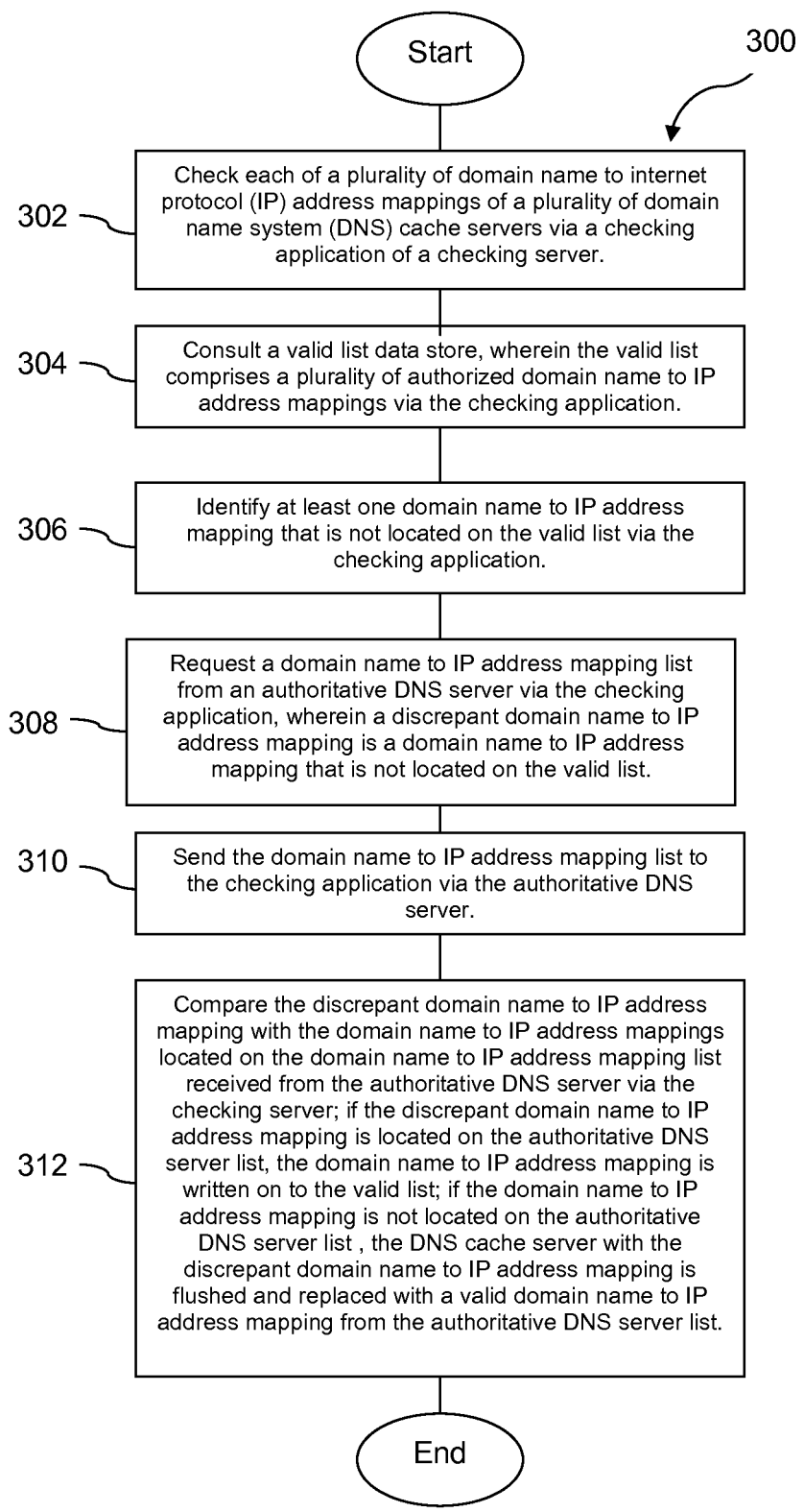
FIG. 3 is a flow chart of a method according to an embodiment of the disclosure.

In FIG. 3, a method 300 is described. At block 302, a checking application via a checking server checks each of a plurality of DNS records, for example each of a plurality of domain name to internet protocol (IP) address mappings, of a plurality of domain name system (DNS) cache servers. At block 304, the checking application consults a valid list data store, wherein the valid list comprises a plurality of authorized DNS records, for example a plurality of domain name to IP address mappings. At block 306, the checking application identifies at least one DNS record, for example at least one domain name to IP address mapping, is not located on the valid list. At block 308, the checking server requests a DNS record or DNS record list, for example a domain name to IP address mapping list, from an authoritative DNS server if a discrepant DNS record, for example a discrepant domain name to IP address mapping, is identified. A discrepant DNS record is a DNS record that is not stored on the valid list. A discrepant domain name to IP address mapping is a domain name to IP address mapping that is not located on the valid list. At block 310, the authoritative DNS server sends the DNS record and/or DNS record list, for example the domain name to IP address mapping list, to the checking application. At block 312, the checking application compares the discrepant DNS record to the DNS record list returned by the authoritative DNS server, for example compares the domain name to IP address mappings with the domain name to IP address mappings located on the list received from the authoritative DNS server. If the discrepant DNS record, for example if the domain name to IP address mapping, is located on the list received from the authoritative DNS server, the DNS record, for example the domain name to IP address mapping, is written on the valid list. If the DNS record Is not located on the list received from the authoritative DNS server, for example if the domain name to IP address mapping is not located on the list received from the authoritative DNS server, the DNS cache server with the discrepant DNS record has the subject DNS record flushed, for example the discrepant domain name to IP address mapping is flushed, and replaced with a valid DNS record, for example a valid domain name to IP address mapping, from the list received from the authoritative DNS server.

Figure 4:
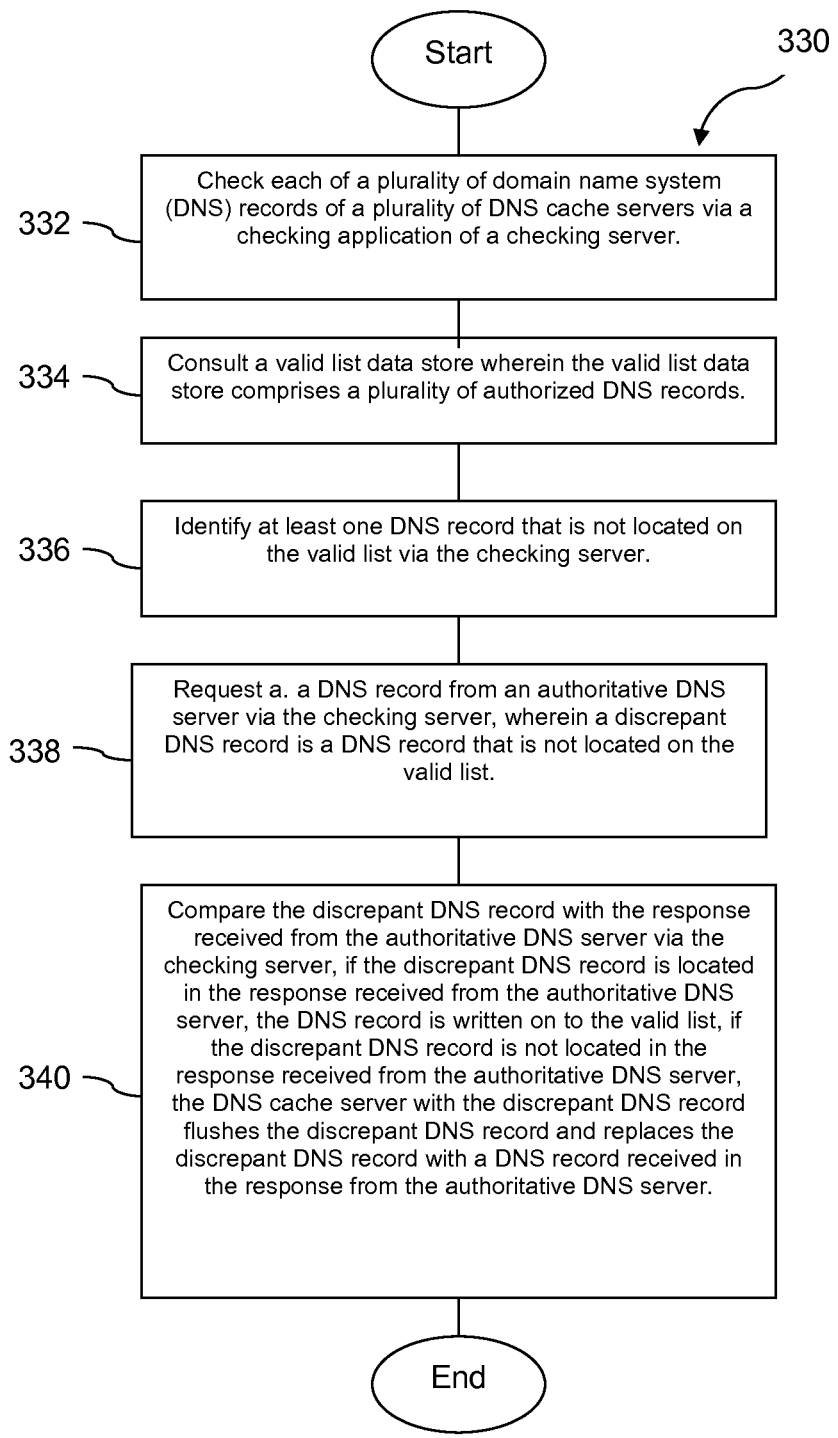
FIG. 4 is a flow chart of another method according to an embodiment of the disclosure.

Turning now to FIG. 4, a method 330 is described. At block 332, each of a plurality of DNS records stored in a plurality of DNS cache servers are checked, for example by a checking application of a checking server. This may comprise comparing like DNS records to each other to determine if they agree with or comport with each other or whether, to the contrary, they conflict with each other. DNS records may conflict with each other in a variety of ways. A conflict between like DNS records may not indicate an error. In some circumstances like DNS records may correctly contain different and/or conflicting information. For example, DNS records may contain different IP address mappings for the same domain name (e.g., when the DNS record is an A record type or an AAAA record type), as may be the case when different DNS cache servers store different mappings to support geographical load balancing domain name to IP address mappings (e.g., west coast accesses to a domain name may map to the IP address of a content server located on the west coast while east coast accesses to the same domain name may map to an IP address of a content server located on the east coast).

At block 334, a valid list is consulted and/or examined. For example, the checking application of the checking server reads the valid list. In an embodiment, the checking application may selectively read entries or rows in the valid list corresponding to some of the DNS records found in the DNS cache servers, for example entries or rows that correspond to one or more DNS records that do not agree with each other or conflict with each other. At block 336, at least one DNS record is identified that is not located on the valid list. For example, at least one of the DNS records that was found to not agree with like DNS records in block 332. Such a DNS record that was searched for but not found on the valid list may be referred to as a discrepant DNS record or as a discrepant record.

At block 338, a DNS record is requested from an authoritative DNS server via the checking server. For example, a discrepant DNS record is requested from the authoritative DNS server. This request may take the form of a DNS query directed to the authoritative DNS server and may request all valid values of the requested DNS record. In an embodiment, the checking server may establish a TCP connection with the authoritative DNS server and transact its query process with the authoritative DNS server over the TCP connection. The response returned by the authoritative DNS server may take the form of a list of valid values. In some contexts, this list may be said to comprise or contain a DNS record or a valid DNS record corresponding to the query. The list may, under some conditions, contain a plurality of DNS records, for example all the valid IP address mappings corresponding to a domain name identified in a query.

At block 340, the discrepant DNS record is compared to the response received from the authoritative DNS server. If the discrepant DNS record is validated or substantiated by the response (e.g., the response comprises a value that comports with or agrees with the discrepant DNS record), the discrepant DNS record is added to the valid list. In this case, the discrepant DNS record is affirmed or confirmed to be valid by the authoritative DNS server, and hence is added to the valid list. In the future, when a non-compare results between the subject DNS record and another DNS record, when the DNS record is found on the valid list, there may be no need to query the authoritative DNS server, thereby reducing the load on the authoritative DNS server, thereby avoiding any time delay involved in setting up, using, and tearing down a TCP connection between the checking server and the authoritative DNS server.

If the discrepant DNS record is not validated by the response (e.g., the response comprise no value that comports with or agrees with the discrepant DNS record), the checking server sends a command to delete the subject discrepant DNS record to the DNS cache server that contains the discrepant DNS record. Such a DNS record that is not validated by the response may be referred to in some contexts as an invalid DNS record. The checking server may further command the DNS cache server to add at least one DNS record received from the authoritative DNS server, for example a valid DNS record corresponding to the invalid DNS record.

Figure 5:
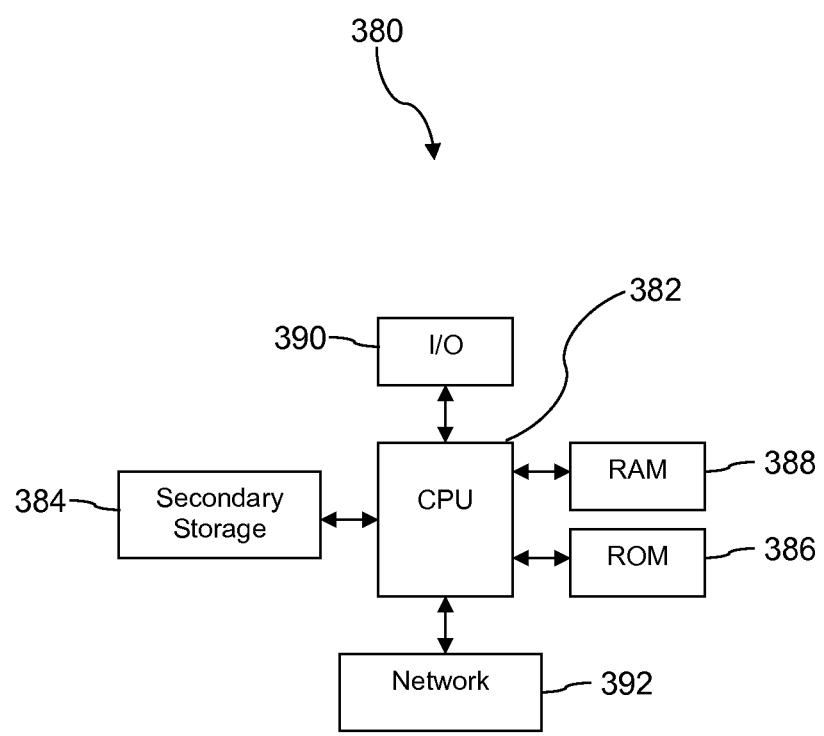
FIG. 5 illustrates an exemplary computer system suitable for implementing the several embodiments of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer specification 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of facilitating a domain name system (DNS) cache integrity check system, comprising:

checking each of a plurality of domain name to internet protocol (IP) address mappings of a plurality of DNS cache servers via a checking application of a checking server;

consulting a valid list data store, wherein the valid list data store comprises a plurality of authorized domain name to IP address mappings;

in response to consulting the valid list, identifying a discrepant domain name to IP address mapping by the checking server, wherein the discrepant domain name to IP address mapping is a domain name to IP address mapping stored in a DNS cache server that is not located on the valid list;

in response to identifying a discrepant domain name to IP address mapping, requesting a domain name to IP address mapping for at least one of the DNS cache servers from an authoritative DNS server by the checking application; and writing the authorized domain name to IP address mapping received from the authoritative DNS server to the valid list.

2. The method of claim 1, wherein the checking application requests the domain name to IP address mapping from the authoritative DNS server over a transmission control protocol (TCP) session connection.

3. The method of claim 2, wherein the authorized domain name to IP address mapping is received from the authoritative DNS server in response to the request for the domain name to IP address mapping sent to the authoritative DNS server over the TCP session connection.

4. The method of claim 1, further comprising: determining that the discrepant domain name to IP address mapping is not authorized by the authoritative DNS server; and deleting an unauthorized domain name to IP address mapping from the DNS cache server that stores the unauthorized domain name to IP address mapping.

5. The method of claim 4, further comprising writing an authorized domain name to IP address mapping for the domain name identified in the unauthorized domain name to IP address mapping into the DNS cache server from which the unauthorized domain name to IP address mapping is deleted.

6. The method of claim 1, wherein a snapshot of all of the domain name to IP address mappings of the plurality of DNS cache servers is taken by the checking application, and wherein the snapshot is a file that stores all of the domain name to IP address mappings.

7. The method of claim 6, wherein the checking application checks the snapshot file to see if there are any discrepancies, wherein if there are, the checking application uses the file from the snapshot to compare the discrepant domain name to IP address mapping to the valid list, and wherein if there are no discrepancies, the snapshot file is cleared.

8. A method of enacting a domain name system (DNS) cache integrity check system, comprising:
    checking each of a plurality of domain name system (DNS) records of a plurality of DNS cache servers via a checking application of a checking server;
    consulting a valid list data store, wherein the valid list data store comprises a plurality of authorized DNS records;
    in response to consulting the valid list, identifying at least one DNS record that is not located on the valid list via the checking server;
    in response to identifying a discrepant DNS record, requesting a DNS record from an authoritative DNS server via the checking server, wherein a discrepant DNS record is a DNS record that is not located on the valid list; and
    in response to receiving a response from the authoritative DNS server, comparing the discrepant DNS record with the response received from the authoritative DNS server via the checking server, wherein if the discrepant DNS record is located in the response received from the authoritative DNS server, the DNS record is written on to the valid list, and wherein if the discrepant DNS record is not located in the response received from the authoritative DNS server, the DNS cache server with the discrepant DNS record flushes the discrepant DNS record and replaces the discrepant DNS record with a DNS record received in the response from the authoritative DNS server.

9. The method of claim 8, wherein the checking server requests the DNS record from the authoritative domain name system server using a transmission control protocol (TCP) session connection.

10. The method of claim 9, wherein the internet protocol address of the checking server is not a well-known internet protocol address.

11. The method of claim 10, wherein the response received from the authoritative DNS server via the checking application of the checking server comprises all valid values of the identified DNS record.

12. The method of claim 8, wherein if the discrepant DNS record is not identified in the response received from the authoritative DNS server, a notification is transmitted.

13. The method of claim 12, wherein the notification is transmitted to an employee of a telecommunications service provider, and wherein the employee is one of a system administrator, an information security technologist, or a manager.

14. The method of claim 13, wherein the notification comprises the discrepant DNS record.

15. A domain name system checking server, comprising;
    a processor;
    a memory; and
    an application stored in the memory that, when executed by the processor,
        accesses a plurality of domain name to internet protocol (IP) address mappings stored by a plurality of DNS cache servers,
        compares the plurality of domain name to IP address mappings stored by the plurality of DNS cache servers,
        requests at least one domain name to IP address mapping for at least one domain name accessed from at least one of the DNS cache servers from an authoritative DNS server, and
        stores the at least one domain name to IP address mapping received from the authoritative DNS server in at least one DNS cache server.

16. The system of claim 15, wherein the application further accesses a plurality of domain name system (DNS) records stored by the plurality of DNS cache servers,
    compares the plurality of DNS records stored by the plurality of DNS cache servers,
    requests at least one DNS record accessed from at least one of the DNS cache servers from an authoritative DNS server, and
    stores the at least one DNS record received from the authoritative DNS server in at least one DNS cache server.

17. The system of claim 15, wherein the application accesses and compares the DNS cache servers at intervals of about every four minutes.

18. The system of claim 15, wherein the application accesses and compares the DNS cache servers in intervals of about every minute, about every two minutes, about every five minutes, about every ten minutes, about every thirty minutes, or about every hour.

19. The method of claim 15, wherein the domain name to IP address mappings used in each of the DNS cache servers are given a time to live period of less than one day, at least one day, or another predefined period of time from the authoritative DNS server.

20. The system of claim 15, wherein the domain name system checking server is communicatively coupled to a network, and wherein the network comprises a public communication network, a private communication network, or a combination thereof.

* * * * *